United States Patent Office 3,641,025
Patented Feb. 8, 1972

3,641,025
STOICHIOMETRIC REGULATION IN CHEMICAL REACTIONS INVOLVING A HIGHLY REACTIVE ACID CHLORIDE, ANHYDRIDE OR A DERIVATIVE THEREOF
Harris E. Petree, Spanish Fort, Ala., assignor to Ciba-Geigy Corporation, Ardsley, N.Y.
No Drawing. Filed Oct. 30, 1968, Ser. No. 771,971
Int. Cl. C07d 55/18
U.S. Cl. 260—249.5                                      5 Claims

ABSTRACT OF THE DISCLOSURE

A method for maintaining the stoichiometry in a reaction between a highly reactive acid chloride or anhydride including derivatives thereof having moieties of differing reactivities and a co-reactant by addng to the reaction medium a fluorescent amine so as to determine the amount of unreacted acid chloride (or anhydride or derivative thereof) present in the reaction medium and adjusting the flow of said reactive acid chloride (or anhydride or derivative thereof) or the co-reactant to the reaction medium so as to maintain the desired stoichiometric ratio.

FIELD OF THE INVENTION

The present invention relates to a method for increasing the yields of the final products in reactions involving a highly reactive acid chloride having other moieties of differing reactivities (or anhydride including derivatives thereof) and a co-reactant by measuring the concentration of the highly reactive chloride compound in the reaction medium and maintaining the stoichiometry by the adjustment or addition of either the reactive acid chloride or co-reactant, in the reaction medium. The determination of the content of the highly reactive chloride compound in the reaction medium is measured by reacting said reactive chloride compound with a fluorescent amine thereby determining the fluorescence The present process is valuable in assuring or maintaining the proper or necessary concentration of reactive chloride compound (or anhydride or derivative thereof) and the co-reactant present in the reaction mixture so as to insure the obtainment, in high yield, of the desired products. The expression "reactive chloride compound" as used herein, is meant to include the anhydrides thereof including their derivatives. The stoichiometry between the reactive chloride compound and the co-reactant is kept substantially uniform, that is, at the proper level of concentration, by the addition or adjustment of the reactive chloride compound or the co-reactant in the reaction mixture. By maintaining the desired stoichiometry not only is control of the reaction carefully regulated, but in addition, extremely high yields of the desired products are assured.

The instant process accordingly provides a broadly applicable and suitable technique for maintaining automated control of reactions involving highly reactive acid chloride compounds and a co-reactant. The present procedure provides, for the first time, a rapid and precise means for maintaining substantially instantaneous and continuous control of reactions involving, for example, the first chlorine moiety of highly reactive acid chloride compounds containing a number of reactive chlorine atoms with various co-reactants such as alkyl or aryl amines, alcohols, thiols, etc.

SUMMARY OF THE INVENTION

In accordance with the present invention, there is provided a procedure for measuring the amount of unreacted acid chloride having moieties of differing reactivities in a reaction involving a highly reactive chloride compound and a co-reactant. This is effected by measuring the concentration or amount of such unreacted chloride compound by addition, to the reaction medium, of a fluorescent amine, so as to determine the fluorescence after a pre-determined period of time and based on the order of fluorescence, maintaining the stoichiometric ratio between the highly reactive chloride compound and the co-reactant by the addition of either the reactive acid chloride compound or the co-reactant to the reaction medium.

It is possible by the present invention to maintain a rapid and also sensitive means of measuring the concentration or amount of the unreacted acid chloride compound in a reaction mixture at any time during a batch reaction process or a process which is operated on a continuous basis. Consequently, by addition, where necessary, or adjustment of the concentration of the reactive acid chloride or the co-reactant, this will assure that the optimum amount of reactive acid chloride is present to react with the co-reactant to form the desired product.

The principle and mode of operation of the present process is based upon the reaction of a highly reactive acid chloride compound having moieties of differing reactivities (preferably in selected aqueous-organic media under specified temperatures and pH conditions) with selected soluble aromatic amines, diamines or polyamines which are referred to as "indicator amines," said indicator amines fluorescing when exposed to ultra-violet light. Under the specified conditions, the reaction products of these indicator amines with the highly reactive acid chloride compound are no longer in solution (or there is a decrease in their fluorescent properties) when exposed to ultra-violet light so that they do not contribute significantly to fluorescence as measured by conventional fluorometric assay equipment presently available; thus, the exact point of extinction of a highly reactive chloride compound in a given aliquot of a highly reactive acid chloride reaction mixture may be detected as the point at which, after the addition of a given quantity of the indicator amine to the aliquot, the fluorescence does not drop below a certain level after a small time interval.

PREFERRED EMBODIMENTS OF THE INVENTION

The present invention relates to a new and novel method for the regulation and control of the stoichiometry which is applicable to either a batchwise or a continuous procedure involving the reaction of a highly reactive acid chloride compound having moieties of differing reactivities with a co-reactant. The process is of commercial importance in that it provides a simple but effective procedure for regulating reactions between highly reactive acid chloride compounds and a co-reactant, and thereby not only assures the obtainment of high yields but also minimizes loss or waste of any unreactive materials.

Among the substances falling within the designation of "highly reactive acid chlorides," there can be included such compounds as phosgene, sulfuryl chloride, phosphorus trichloride, phosphorus oxychloride, organic carboxylic acid chlorides and anhydrides including their derivatives and, in addition, organic radicals which are attached to said chloride or anhydride compounds.

A particularly preferred highly reactive acid chloride compound is cyanuric acid trichloride, an important intermediate used in the preparation of herbicides, antioxidants and stabilizers, optical brightening agents and other useful functional organic compounds. Because of the high reactivity of cyanuric acid trichloride (1,3,5-trichloro-s-triazine), it is essential, in order to insure high yields in any reactions involving this compound, that the stoichiometry of the reactants should be measured and also carefully and precisely controlled. It is therefore critical and essential that only the first chlorine moiety of cyanuric acid trichloride should react with the desired co-reactant, preferably an amine, in high conversion and that hydrolytic side reactions should be minimized to avoid diminution in yield of the desired product.

In order to achieve an exact 1:1 stoichiometric ratio of cyanuric acid chloride to amine, there are a number of serious problems which are encountered especially under commercial production conditions, that is, using batch wise conditions as well as a continuous reaction procedure. For one thing, the weighing and charging of cyanuric acid trichloride is difficult because of the intensely irritating nature of this substance, and this in turn causes a corrosive atmosphere which adversely affects the continuing dependability of weighing scales used in such an atmosphere. The exposure of cyanuric acid trichloride to a moist atmosphere results in hydrolytic degradation of the surface of the cyanuric acid trichloride particles. In addition, delays in the starting of the reaction which may be due, for example, to mechanical problems increases the possibilities of such undesirable hydrolysis. Further, generally during a reaction, a certain portion of the cyanuric acid trichloride will hydrolyze so that the effective amount that is present when nearing the end point of the first chlorine substitution does not correspond consistently or closely to the amount of starting material originally charged. There are other obvious and accompanying difficulties associated with the use, in reactions with other compounds, of a highly reactive compound such as cyanuric acid trichloride.

It is therefore extremely important to determine the exact "extinction" point at which the last available amount of the cyanuric acid trichloride has become involved in the reaction so that addition of further amounts of a co-reactant amine can be immediately halted to avoid waste, while at the same time providing assurance that there is a stoichiometric ratio between the reactants to insure the obtainment of the desired product in high yield, i.e., isopropylamine, in the preparation of Atrazine (2-chloro-4-ethylamino - 6 - isopropylamino-s-triazine).

In addition to the foregoing, it has also been found that where there is an improper stoichiometric ratio of reactants, as in an uncontrolled over-charging of the first amine, for example, in a reaction involving the preparation of Atrazine (2-chloro-4-ethylamino-6-isopropylamino-s-triazine) by reacting cyanuric acid trichloride with isopropylamine to obtain 2,6-dichloro-4-isopropylamino-s-triazine followed by reacting the last mentioned product with monoethylamine to obtain Atrazine, this leads to the formation (under conditions conducive to reaction of the second chlorine moiety of cyanuric chloride with a second amine) of an undesirable by-product. Likewise, if there is an insufficient quantity of reactant amine, this too leads to the formation of undesirable by-products. It is therefore important to maintain a proper stoichiometry between the reactants to avoid formation of undesirable by-products including not only attendant difficulties in recovering the desired product but also a substantial loss in yield.

Procedures heretofore used in attempting to control the 1:1 stoichiometry between a highly reactive acid chloride compound and particularly cyanuric acid trichloride and an amine co-reactant have either been unduly complicated or inaccurate due to mechanical problems. Thus, in some instances, it has been found difficult to obtain a homogeneous sample; then there are problems in hydrolysis of the cyanuric acid trichloride during the analysis or there is some difficulty attached to attempting to secure an independent analysis for the first amine, etc.

The present procedure accordingly provides, in a specific and preferred embodiment thereof, both a rapid and sensitive means of measurement of the concentration (or amount) of unreacted cyanuric chloride in an amine-cyanuric acid trichloride reaction mixture at any time during either a batch reaction or a procedure which is operated on a continuous basis. Such a measurement is highly desirable since it enables immediate detection of the end point of the batch reaction or control of the ratio and speed rates of the amine and cyanuric acid trichloride in a continuous reactor.

The principle and mode of operation of the present invention are based upon the discovery of a rapid reaction of cyanuric acid trichloride (in selected aqueous organic media under specified conditions of temperature and pH) with selected soluble aromatic amines, diamines, or polyamines referred to herein as "indicator amines" which fluoresce when exposed to ultra-violet light. Under specified conditions, the reaction products of these indicator amines with cyanuric acid trichloride are no longer in solution (or else there is a decrease in their fluorescent properties) when exposed to ultra-violet light so that they do not contribute significantly to fluorescence as determined by conventional fluorometric assay equipment presently available.

It has therefore been found that the exact point of extinction of cyanuric acid trichloride (or any reactive chloride compound) in a given aliquot of an amine-cyanuric acid trichloride reaction mixture may be detected as the point at which, after the addition of given quantity of the indicator amine to the aliquot, the fluorescence of this reaction mixture or solution does not drop below a certain level after a small interval of time. Thus, the absence of unreacted cyanuric chloride may be detected by the addition of a fluorescent amine to an aliquot and the fluorescence reading does not drop below a certain level after a predetermined brief interval of time, i.e., up to about 20 seconds.

By using the unique system in the present invention, it is possible to effectively control the production of 2,4-dichloro-6-substituted-s-triazines by regulating the quantities of cyanuric acid trichloride and a co-reactant so as to assure continuous inter-reaction between the co-reactants resulting in the obtainment of highest possible yield of the product and highest purity.

A typical illustration of the present process would involve regulation of the reactants used in preparing 2,4-dichloro-6-substituted-s-triazines so as to obtain optimum yields and the highest purity. Since the desired products can be prepared either by a continuous system or a batchwise system, there are modifications in the system depending upon the process which is used. In a continuous system, for example, a small metered side stream from a reactor vessel containing a 2,4-dichloro-6-substituted-s-triazine together with unreacted cyanuric acid trichloride (as long as this last mentioned substance is still present in the reactor) meets a second metered mixture consisting of the "indicator" amine solution dissolved in an aqueous-organic solvent. The flow rate of the fluorescent or "indicator" amine is adjusted by a suitable device such as, for example, a continuously variable precision feed pump identified as "FMI Lab Pump" (manufactured by Fluid Metering Inc., Oyster Bay, N.Y. 11771) and the fluorometer reading is set, for example, at the 50% point on the recording chart. When the fluorescence value is lowered, this will result in either decreasing the feed rate of the co-reactant or increasing the feed rate of the cyanuric acid trichloride solution until the aforesaid fluorescence base value is restored. It is obvious that in order to obtain best results, it is necessary to keep the temperature of the mixture passing through the fluorometers constant, that is, between about 0° C. and the ambient temperature of the reactor. Where, however, a batchwise process is used, a sample stream, coming from the reactor vessel is continuously pumped in the fluorometer (which is kept at constant temperature) and here it is mixed by a metered pump, with a small and diluted stream of the fluorescent amine. After a brief period of time which is sufficient to allow reaction of the cyanuric acid trichloride with the fluorescent amine, the stream is passed through the fluorometer. A positive fluorometer reading is obtained when the first chlorine atom of the cyanuric acid trichloride is completely reacted and the resulting signal can be used to stop the addition of the reactant to the cyanuric acid trichloride.

Fluorescent or "indicator" amines which can be used in the present process would include polyamines or any primary or secondary aliphatic amine which fluoresces on exposure to ultraviolet light with the further proviso that the solubility of such amines, in the reaction stream, is adequate and the reactivity of such amines is high enough so that there is rapid reaction with the unreacted cyanuric acid trichloride. Typical useful fluorescent amines are mono- or disulfonic acid salts of p-amino-azo-benzene or -aniline, amino-coumaric acid salts, amino-phenanthrene-sulfonic or carboxylic acid salts and particularly 4,4'-diaminostilbene-2,2'-disulfonic acid and 4-aminostilbene-2-sulfonic acid, and the like, in an aqueous organic solvent medium containing one equivalent of an acid acceptor such as, for example, soda ash (anhydrous sodium carbonate), sodium hydroxide, potassium hydroxide, and the like, so as to maintain the desired pH at which the reaction with the cyanuric acid trichloride is sufficiently rapid so that the ensuing decrease in fluorescence provides both a rapid and accurate measure of the amount of unreacted cyanuric acid trichloride.

As indicated supra, the present process is particularly adapted for use in reactions between a reactive acid chloride such as, for example, cyanuric acid trichloride, anhydrides and derivatives thereof, and ammonia, primary or secondary aliphatic and aromatic amines, aliphatic or aromatic alcohols and thioalcohols, and the like. Included within the category of primary and secondary aliphatic and aromatic amines which, for example, can be reacted with cyanuric acid chloride to form 2,4-dichloro-6-substituted-s-triazines are amines of the formula

wherein
$R_1$ is hydrogen, lower alkyl, lower alkenyl, lower alkynyl, lower alkoxy-lower alkyl, lower alkylthio-lower alkyl, cycloalkyl having from 3 to 8 carbon atoms, phenyl, phenyl lower alkyl and phenyl lower alkanoyl, and
$R_2$ is hydrogen, lower alkyl, lower alkenyl, lower alkynyl and lower alkanoyl.

Typical aliphatic and aromatic alcohols and thioalcohols as well as other substances which are also co-reactants and can react with cyanuric acid dichloride to form 2,4-dichloro-s-triazine are compounds represented by the formula

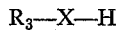

wherein
$R_3$ is lower alkyl, lower alkenyl, lower alkynyl, phenyl, phenyl lower alkyl and phenyl lower alkenyl, and
X is oxygen or sulfur.

The alkyl and alkenyl groups set out in the above identified formulae can be substituted by various atoms and groups such as, for example, halogen atoms, i.e., chlorine and bromine, nitro groups, cyano groups, and the like. The phenyl substituents similarly can be substituted by halogen atoms such as chlorine and bromine, lower alkyl, nitro groups, sulfo groups, and the like.

The term "lower" as used herein is meant to include groups containing from 1 to 6 carbon atoms.

The aqueous-organic media mentioned above which are disclosed as being useful in the process for the preparation of 2,4-dichloro-6-substituted-s-triazines include, in combination or admixture with water, such solvents as methyl ethyl ketone, acetone, methyl isobutyl ketone, benzene, toluene, dioxan, dimethylformamide, ethylene glycol, diethyl ether, and the like.

The following non-limitative examples are intended only to illustrate the process of the invention and are not therefore to be considered as limiting. Unless otherwise indicated, parts are given by weight and the temperatures are in degrees centigrade.

EXAMPLE I

Methyl ethyl ketone is charged into a reactor vessel along with ice and cooled (by supplemental refrigeration, if required), to maintain a temperature ranging between −10° and −6° C. so as to minimize hydrolysis of cyanuric acid trichloride. A molar quantity of cyanuric acid trichloride is then added. The mixture is vigorously agitated, and at a pH of 3, isopropylamine so as to maintain a constant pH.

As soon as a pumpable mixture is obtained, a very small regulated sample stream (an aliquot amount) of the reactor's contents is continuously pumped to a fluorometric analysis apparatus, Turner Fluorometer Model 111, manufactured by Turner Associates, Palo Alto, Calif., maintained at a constant temperature of 0° C. and the stream is then admixed, by a metered pump, with a small and dilute stream of 4,4'-diaminostilbene-2,2'-disulfonic acid. After a short time, the stream is passed through a fluorometer tube. On nearing the calculated end point of the reactant addition, the addition of isopropylamine is gradually slowed down or added in increments of a fraction of a percent by a control signal from the fluorometer. At the point when the first chlorine moiety is fully reacted, from the reactor contents, a positive fluorometer reading is observed. This signal can be used to halt the addition of the first reactant and, in the case where it is desired to manufacture Atrazine (2-chloro-4-ethylamino-6-isopropylamino-s-triazine), the volumetric meter reading of the isopropylamine feed line is linked with a second meter which sets the desired amount of monoethylamine together with the acid acceptor, i.e., sodium carbonate or sodium hydroxide, to be added. It is important, however, that when the addition of the first reactant is completed, the introduction of the second reactant should be effected without delay, together with the acid acceptor (admixed equivalently or as a separate stream) so as to minimize hydrolytic side reactions of the mono-substituted-dichloro-s-triazine.

Thus, the entire batch synthesis can be automated so that the exact desired stoichiometric control is achieved regardless of variations in the weighings of cyanuric acid trichloride or of interim hydrolysis of the first chlorine moiety of cyanuric acid trichloride. Following such a procedure, the highest product purity and yields are consistently obtainable with minimal operational error.

Where isopropylamine is reacted with the cyanuric acid trichloride, as indicated above, the reaction medium can be maintained in a wide latitude, that is, in a pH range of 2-14.

While the use of amine, that is, isopropylamine, is illustrated above, comparable results are also obtainable by replacing the amine by other co-reactants such as, for example, an aromatic amino-sulfonic acid such as sulfanilic or metanilic acid, an alcohol, thioalcohol, phenol, and the like.

EXAMPLE II

Following the procedure set out in Example I, except for the addition of the isopropylamine at a pH of 4–8 and 8–12, comparable results are obtained.

EXAMPLE III

A mixture of cyanuric acid trichloride with toluene and a mixture of isopropylamine with one equivalent of sodium carbonate (or sodium hydroxide) is fed continuously, into a reactor vessel which is maintained, by cooling, at a temperature of about 15° C. Independent methods for establishing the ratio of cyanuric acid trichloride to 2,4-dichloro-6-isopropylamino-s-triazines are used to regulate the flow rates. As soon as the desired concentration of the reactants is found, a small side stream from the reactor vessel is pumped to a fluorometric analyzer (thermostat controlled) similar to that described in Example I. In this analyzer, a stream of a mixture of indicator amine together with acid acceptor and solvent meets the stream from the reactor vessel and is conducted through the fluorometer tube. When the fluorescence value increases, then either the flow rate of the isopropylamine is increased or the flow rate of the cyanuric acid trichloride solution is decreased until the fluoroescence base value is restored.

It will be understood that various changes may be made in the preferred embodiments of the process described hereinabove. Accordingly, the preceding description is intended to be illustrative only and should not be considered in a limitative sense.

What is claimed is:

1. A process for maintaining a 1:1 stoichiometric ratio in a reaction between (a) highly reactive acid chloride of the group consisting of cyanuric acid trichloride, phosgene, sulfuryl chloride, phosphorus trichloride, phosphorus oxychloride, an organic carboxylic acid chloride, an organic carboxylic anhydride and a derivative thereof and (b) a coreactant which is a member selected from the group consisting of (1) an amine of the formula

wherein
$R_1$ is a member selected from the group consisting of hydrogen, lower alkyl, lower alkenyl, lower alkynyl, lower alkoxy-lower alkyl, lower alkylthio-lower alkyl, cycloalkyl having from 3 to 8 carbon atoms, phenyl, phenyl lower alkyl and phenyl lower alkanoyl, and
$R_2$ is a member selected from the group consisting of hydrogen, lower alkyl, lower alkenyl, lower alkynyl and lower alkanoyl
and (2) a compound of the formula

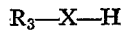

wherein
$R_3$ is a member selected from the group consisting of lower alkyl, lower alkenyl, lower alkynyl, phenyl, phenyl lower alkyl and phenyl lower alkenyl, and
X is oxygen or sulfur
which comprises adding a fluorescent amine selected from the group consisting of 4,4′-diaminostilbene-2,2′-disulfonic acid, 4-aminostilbene-2-sulfonic acid, a monosulfonic acid salt of aniline, a disulfonic acid salt of aniline, an amino-coumaric acid salt, an amino-phenanthrene-sulfonic acid salt and an amino-phenanthrenecarboxylic acid salt, to an aliquot portion of the reaction medium, measuring the fluorescence on a fluorometer to determine the degree of reaction between said fluorescent amine and said reactive chloride, and, based on the fluorometric reading, adding a sufficient amount of either of the reactants to the reaction medium to maintain said 1:1 stoichiometric ratio.

2. A process according to claim 1 wherein the coreactant is a primary aliphatic amine having up to 6 carbon atoms.

3. A process according to claim 1, wherein the co-reactant is a member selected from the group consisting of a primary aliphatic amine, a secondary aliphatic amine and an aromatic amine.

4. A process according to claim 1, wherein the fluorescent amine is 4,4′-diaminostilbene-2,2′-disulfonic acid or 4-aminostilbene-2-sulfonic acid.

5. A process according to claim 1, wherein the highly reactive acid chloride is cyanuric acid trichloride, the coreactant is isopropylamine and the fluorescent amine is 4,4′-diaminostilbene-2,2′-disulfonic acid.

References Cited

UNITED STATES PATENTS

| | | | |
|---|---|---|---|
| 3,376,302 | 4/1968 | Grauer | 260—240 X |
| 3,382,200 | 5/1968 | Buell | 260—240 X |

FOREIGN PATENTS

| | | | |
|---|---|---|---|
| 528,445 | 7/1956 | Canada | 260—240 |

JOHN D. RANDOLPH, Primary Examiner

U.S. Cl. X.R.

23—230 M; 260—240 B, 248 R, 249.8, 551 P, 551 S, 557 R, 558 R, 561 R, 562 R